United States Patent
Li et al.

(10) Patent No.: US 11,263,809 B2
(45) Date of Patent: Mar. 1, 2022

(54) TBM-MOUNTED VIRTUAL RECONSTRUCTION SYSTEM AND METHOD FOR SURROUNDING ROCK STRUCTURE OF TUNNEL

(71) Applicant: SHANDONG UNIVERSITY, Shandong (CN)

(72) Inventors: Shucai Li, Jinan (CN); Heng Shi, Jinan (CN); Zhenhao Xu, Jinan (CN); Peng Lin, Jinan (CN); Fumin Liu, Jinan (CN); Si Chen, Jinan (CN); Xiaote Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/254,590

(22) PCT Filed: Jan. 21, 2020

(86) PCT No.: PCT/CN2020/073607
§ 371 (c)(1),
(2) Date: Dec. 21, 2020

(87) PCT Pub. No.: WO2021/042668
PCT Pub. Date: Mar. 11, 2021

(65) Prior Publication Data
US 2021/0366186 A1 Nov. 25, 2021

(30) Foreign Application Priority Data
Sep. 6, 2019 (CN) .......................... 201910844309.1

(51) Int. Cl.
*G06T 17/05* (2011.01)
*G06T 7/00* (2017.01)

(52) U.S. Cl.
CPC ............ *G06T 17/05* (2013.01); *G06T 7/0002* (2013.01); *G06T 7/97* (2017.01)

(58) Field of Classification Search
None
See application file for complete search history.

(56) References Cited

U.S. PATENT DOCUMENTS 9,989,671 B2 * 6/2018 Li ........................... G01V 11/00
10,455,755 B2 * 10/2019 Stanhope ............. A01B 69/008
(Continued)

FOREIGN PATENT DOCUMENTS

| CN | 105842242 A | 8/2016 |
|---|---|---|
| CN | 106599453 A | 4/2017 |

(Continued)

OTHER PUBLICATIONS

Apr. 16, 2020 International Search Report issued in International Patent Application No. PCT/CN2020/073607.
(Continued)

*Primary Examiner* — James A Thompson
(74) *Attorney, Agent, or Firm* — Oliff PLC (57) ABSTRACT

A TBM-mounted virtual reconstruction system and method for a tunnel surrounding rock structure, the method including: obtaining image information of surrounding rock; receiving the image information of the surrounding rock; transforming and splicing pictures taken at different angles, to form a complete image reflecting the surrounding rock; recognizing and describing a surrounding rock feature of the complete image, and transmitting the annotated image to a virtual reconstruction module; displaying the complete image with a description of the surrounding rock feature by using a virtual reality device, to reflect surrounding rock situations at different angles/different positions. This has the advantages of high equipment automation, not prolonging (Continued)

the construction time, not requiring the sketcher to enter the tunnel, precise surrounding rock feature parameters, and supporting remote control.

10 Claims, 6 Drawing Sheets

(56) References Cited

U.S. PATENT DOCUMENTS

| | | |
|---|---|---|
| 2010/0249957 A1 | 9/2010 | Price |
| 2012/0191269 A1* | 7/2012 | Chen .................... G05D 1/0038 701/2 |
| 2017/0218757 A1* | 8/2017 | Li ............................ G01V 1/04 |
| 2019/0384294 A1* | 12/2019 | Shashua ................. G01C 21/32 |
| 2020/0020093 A1* | 1/2020 | Frei ....................... G06K 9/6262 |
| 2020/0393595 A1* | 12/2020 | Lee ......................... G06T 17/05 |
| 2021/0004610 A1* | 1/2021 | Huang ................. B60W 60/00 |
| 2021/0094577 A1* | 4/2021 | Shalev-Shwartz ........ G06T 7/20 |

FOREIGN PATENT DOCUMENTS

| | | |
|---|---|---|
| CN | 106846479 A | 6/2017 |
| CN | 109766894 A | 5/2019 |
| CN | 110111412 A | 8/2019 |

OTHER PUBLICATIONS

Apr. 16, 2020 Written Opinion issued in International Patent Application No. PCT/CN2020/073607.

\* cited by examiner

TBM-MOUNTED VIRTUAL RECONSTRUCTION SYSTEM AND METHOD FOR SURROUNDING ROCK STRUCTURE OF TUNNEL

BACKGROUND

Technical Field

The present disclosure belongs to the field of geotechnical engineering, and relates to a TBM-mounted virtual reconstruction system and method for a surrounding rock structure of tunnel.

Related Art

The description in this section merely provides background information related to the present disclosure and does not necessarily constitute the prior art.

Monitoring surrounding rock of tunnel is an indispensable part of tunnel construction and an important means for ensuring safety of tunnel engineering. A geological sketch of surrounding rock structure of tunnel can precisely reflect properties of the tunnel surrounding rock structure, accurately quantify some important parameters of the surrounding rock structure of tunnel, and guide construction personnel to make an advance geological prediction for the tunnel. The geological sketch may be compared with the advance geological prediction to verify accuracy of the advance geological prediction.

It is found by the inventor that currently, conventional geological sketching methods rely on manual operation, and the tunnel is monitored by using a geological compass, a geological hammer, and the like. Sketching work is greatly dependent on work experience of the sketcher, and has a large workload. Especially for a long and large tunnel, it takes a long time to enter and exit the tunnel, greatly affecting the work efficiency. False identification easily occur for a structural plane with a relatively large or relatively small angle to the tunnel.

SUMMARY

To resolve the foregoing problems, the present disclosure provides a TBM-mounted virtual reconstruction system and method for a surrounding rock structure of tunnel. The present disclosure has the advantages of high equipment automation, not prolonging the construction time, not requiring the sketcher to enter the tunnel, precise surrounding rock feature parameters, and supporting remote control, and therefore has a good application prospect.

According to some embodiments, the following technical solutions are used in the present disclosure:

A TBM-mounted virtual reconstruction system for a surrounding rock structure of tunnel is provided, including a data collection module, an image processing module, a virtual reconstruction module, an image recognition module, and a central analysis and control module, where:

the data collection module is configured to obtain image information of surrounding rock, send the image information to the image processing module, accept control of the central analysis and control module, and feed back an image obtaining status;

the image processing module is configured to receive the image information of the surrounding rock, perform projection transformation on captured pictures to reflect distance information of the surrounding rock, crop and splice pictures captured at the same distance to form a surrounding rock image that can reflect exposed surrounding rock of a fixed width, annotate position information of the image in the middle of the image before the splicing, splice images of exposed surrounding rock formed at different distances according to a distance sequence to form a complete image that can reflect exposed surrounding rock of the entire tunnel, then transmit the complete image to the image recognition module, and feed back a module status to the central analysis and control module;

the image recognition module is configured to perform recognition and position determining on a surrounding rock feature of the complete image, and transmit an image with a position and a feature identifier to the virtual reconstruction module, and feed back a module status to the central analysis and control module;

the virtual reconstruction module is configured to display the complete image with a description of the surrounding rock feature by using a virtual reality device, to reflect surrounding rock situations at different angles/different positions; and the central analysis and control module is configured to control running statuses and signal transmission of other modules.

In a possible implementation, the data collection module includes a track mounted on the TBM, a carrier board is slidably disposed on the track, an image acquisition apparatus is carried on the carrier board, several laser rangefinders are disposed on an edge of the carrier board, a protective box that moves with the carrier board is sleeved outside the carrier board, at least one face of the protective box is transparent, a cleaning mechanism is disposed on an outer side of the face, and both the image acquisition apparatus and the laser rangefinder are connected to a controller.

In a possible implementation, a connection mechanism is disposed on a lower end of the carrier board to connect the carrier board to the track, the connection mechanism includes a connection shell, a connection ball, a hydraulic damper, and a telescopic mechanism that are sequentially connected, the telescopic mechanism is connected to the track through a base, the connection shell is disposed on the lower end of the carrier board, and an angle sensor is further disposed on a lower surface of the carrier board.

As a further limitation, the connection shell and the connection ball are rotatably connected to each other.

As a further limitation, a toothed groove is provided on the track, and the base can be engaged with the toothed groove.

In a possible implementation, the cleaning mechanism includes a glass cleaner injector and a cleaning brush, the glass cleaner injector is disposed on an edge of an inner side of the transparent face of the protective box, the cleaning brush can swing around a connection point between the cleaning brush and the protective box, and the glass cleaner injector and the cleaning brush are controlled by the controller.

In a possible implementation, the image recognition module recognizes the surrounding rock feature and the position in the image by using a Faster R-CNN method, and annotates feature information at the position of the corresponding feature in the spliced image.

In a possible implementation, the surrounding rock feature includes an intrusion situation, a structural plane occurrence, a slough situation, and a water leakage situation.

In a possible implementation, the virtual reality device is a head-mounted AR/VR device.

A working method based on the foregoing system is provided, including the following steps:

capturing a set of surrounding rock images at different preset angles at intervals;

performing projection transformation on captured pictures to form a rock image under unified conditions (a focal length and a shooting distance);

cropping the modified image, so that each picture can reflect only a surrounding rock situation of a fixed-dimension range; annotating and displaying, in the middle of the picture, a distance at which the picture is captured, and splicing, in sequence, all pictures that are captured at the same distance and that are obtained after the projection and the cropping, to form one picture; and splicing the picture and an existing spliced image of tunnel surrounding rock;

detecting a surrounding rock feature situation and a related position, and adding parameter information at a corresponding position in the picture; and completely reconstructing a complete spliced image of the exposed tunnel surrounding rock, a feature, and corresponding position information by using a virtual reality technology.

In a possible implementation, the image acquisition apparatus is docked at an initial position, the carrier board adjusts a relative position with the surrounding rock to make a lens of the image acquisition apparatus directly face the surrounding rock, the image acquisition apparatus regularly obtains a tunneling distance parameter from the TBM system, the carrier board drives the image acquisition apparatus to move along the track to photograph the surrounding rock when a moving distance reaches a specified length, and the image acquisition apparatus returns to the initial position after photographing.

Compared with the prior art, the present disclosure has the following beneficial effects:

The present disclosure is mounted on a TBM, and does not affect TBM construction during a working process. The present disclosure can continuously obtain data from the TBM in the TBM tunneling process, collect surrounding rock image data at different positions according to system settings, and remotely control working state data of the system, thereby realizing automatic work. Manual surveillance for a long time is not required, thereby reducing labor and leading to higher construction efficiency, more safety, and more convenience.

The present disclosure obtains a panoramic image of the surrounding rock by using a steel track and a protective box, thereby reducing a quantity of cameras, reducing construction costs, and reducing occupation of tunnel space. In addition, the protective box can prevent the camera from being damaged by falling rocks and polluted by dust during use of the camera, and a determining and processing method for automatic cleaning is used to ensure that tempered glass on a side of the protective box is transparent when the camera is used, to ensure that pictures captured by the camera are clear and reliable.

The present disclosure integrates functions such as collection of information about tunnel surrounding rock, digital image processing, surrounding rock feature recognition, virtual reality display, and concentrates surrounding rock features of the entire tunnel on a picture, thereby implementing continuous observation of the surrounding rock situation, so that an observer learns of more detailed surrounding rock situations. The present disclosure is more practical for selecting a construction scheme and arranging materials, and reduces labor and material waste, thereby lowering construction costs. A party for subsequent tunnel management and maintenance can arrange a maintenance scheme according to the surrounding rock situation of the tunnel.

The present disclosure provides a more intuitive feeling for the observer by using the virtual reality technology, so that the observer can fully grasp the surrounding rock situation outside the tunnel.

The present disclosure determines and annotates the surrounding rock feature and position by using a deep learning technology without being subjectively affected by human, has high precision, and lowers the industry threshold. Even a non-geologist can quickly learn of the surrounding rock situation by using the system, thereby improving an intelligence degree of the TBM construction, reducing labor, and saving engineering costs.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

1. Track; 2. Glass cleaner injector; 3. Cleaning brush; 4. Laser rangefinder; 5. Protective box; 6. Carrier board; 7. Camera; 8. Angle sensor; 9. Tempered glass; 10. Connection ball; 11. Connection shell; 12. Hydraulic damper; 13. Motor; 14. Drive mechanism; 15. Base; 16. Toothed groove; 17. Controller; 18. Surrounding rock; 19. Program; 20. Signal sensor; 21. Remote control; 22. Head-mounted VR display device.

DETAILED DESCRIPTION

The present disclosure is further described below with reference to the accompanying drawings and embodiments.

It should be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. For example, unless otherwise specified in the context, singular forms are also intended to include plural forms. In addition, it should be further understood that, when the terms "comprise" and/or "include" are used in this specification, it indicates that there is a feature, a step, an operation, a device, a component, and/or a combination thereof.

Figure 1:
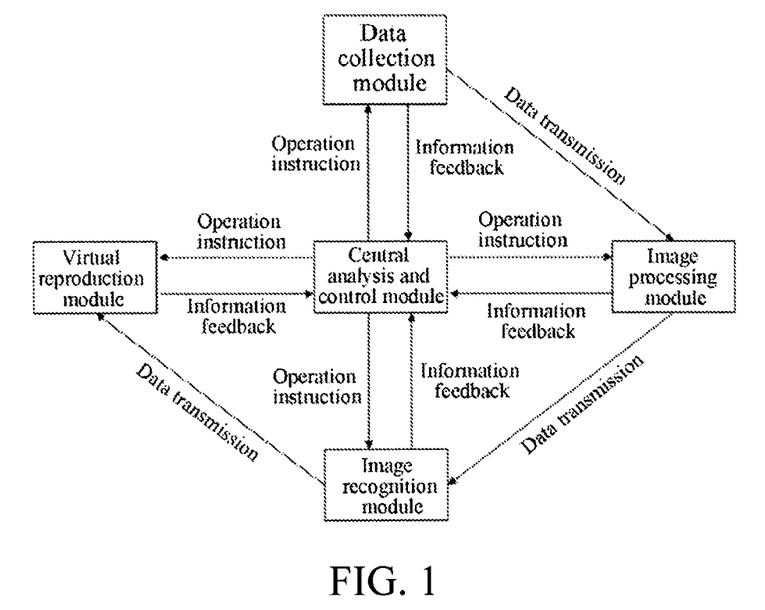
FIG. 1 is an architectural diagram of the system.
Figure 2:
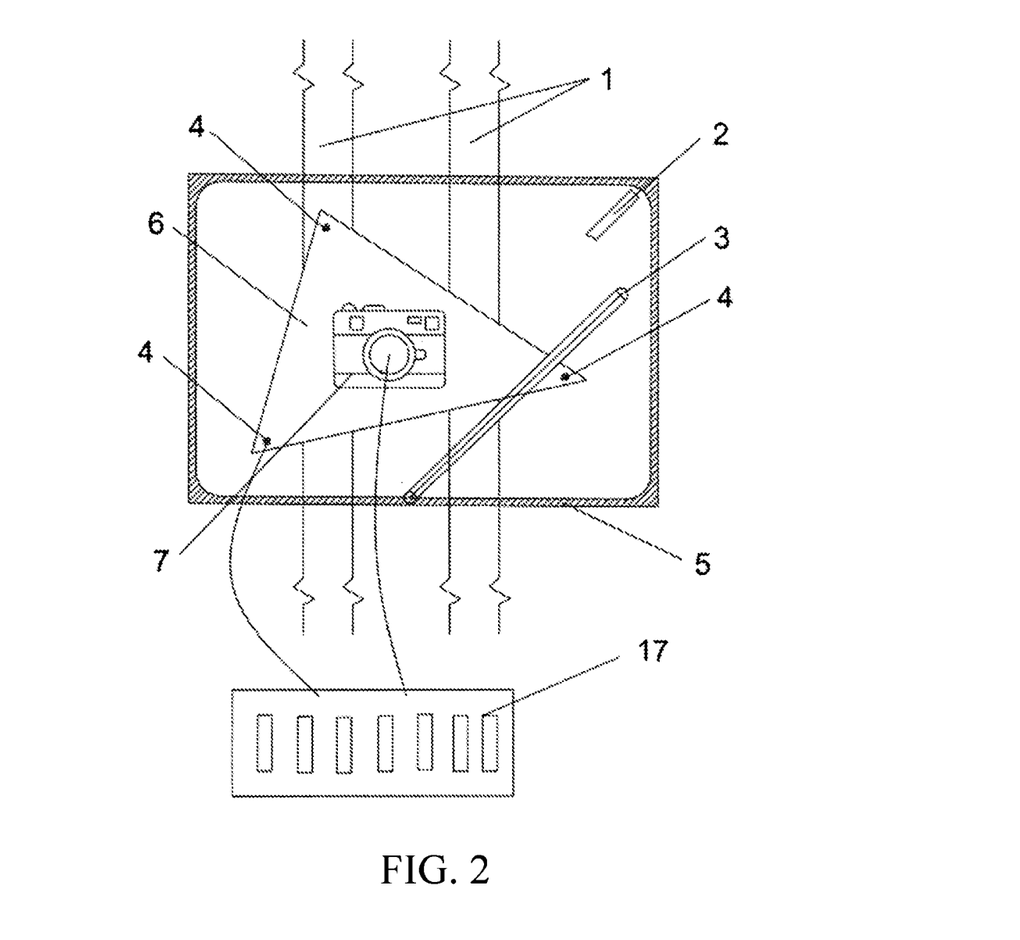
FIG. 2 is a schematic diagram of a data collection module of the system.

As shown in FIG. 1 and FIG. 2, a TBM-mounted sketching and virtual reconstruction system for tunnel surrounding rock is provided, including a data collection module, an image processing module, an image recognition module, a virtual reconstruction module, and a central analysis and control module.

Figure 4:
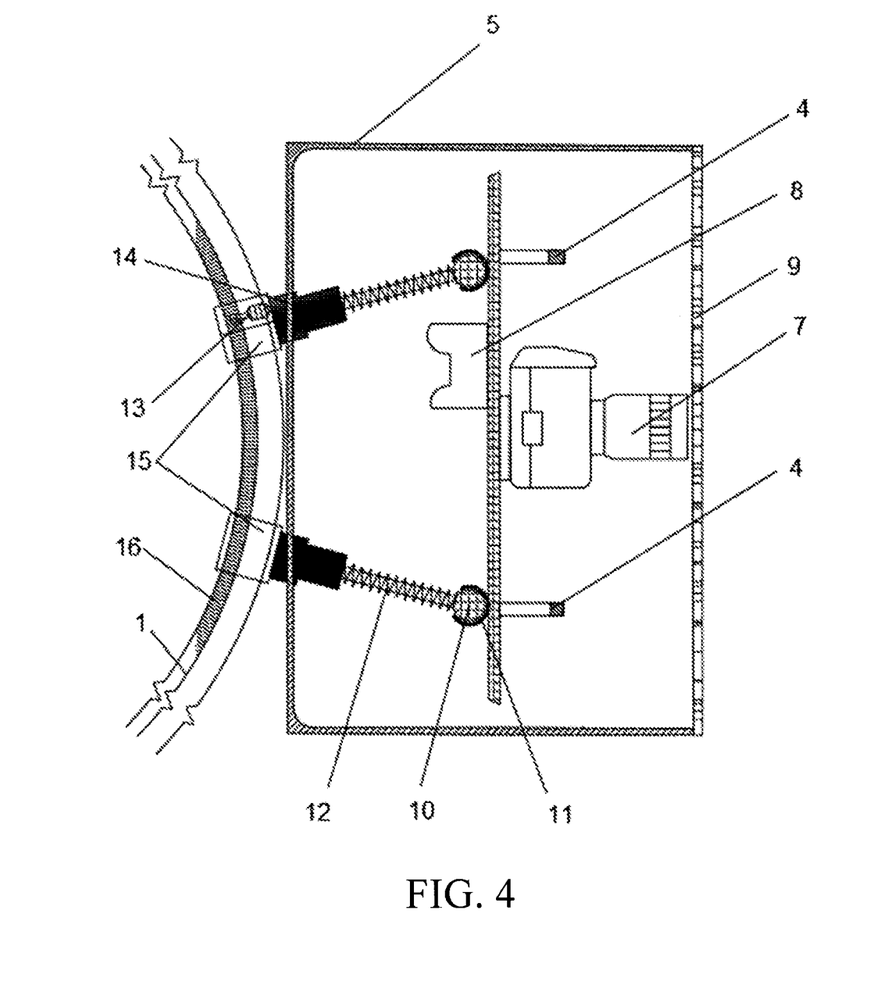
FIG. 4 is a side view of a data collection module of the system.

As shown in FIG. 2 and FIG. 4, the data collection module includes a track 1 mounted on the TBM, and a carrier board 6 is slidably disposed on the track. An image acquisition apparatus (a camera 7 in this embodiment) is carried on the carrier board 6. Several laser rangefinders 4 are disposed on an edge of the carrier board 6. A protective box 5 that moves with the carrier board 6 is sleeved outside the carrier board, and at least one face of the protective box 5 is transparent. In this embodiment, tempered glass 9 is disposed on the face, and a glass cleaner injector 2 and a cleaning brush 3 are disposed on an outer side of the tempered glass 9. The cleaning brush 3 can rotate on the tempered glass 9 by using a connection point between the cleaning brush 3 and the tempered glass 9 as a rotation point. The camera 7 and the laser rangefinder 4 are both connected to a controller 17.

The controller 17 controls running of the glass cleaner injector 2, the cleaning brush 3, the laser rangefinder 4, the camera 7, a motor 13, and a drive mechanism 14 through a cable.

In this embodiment, there are three laser rangefinders 4 that are all connected to the central analysis and control module and that transmit distance information. The camera 7 is fixed on the carrier board 6. The camera is connected to the image processing module and transmits data. The protective box 5 and the tempered glass 9 work together to secure instruments such as the camera.

Figure 5:
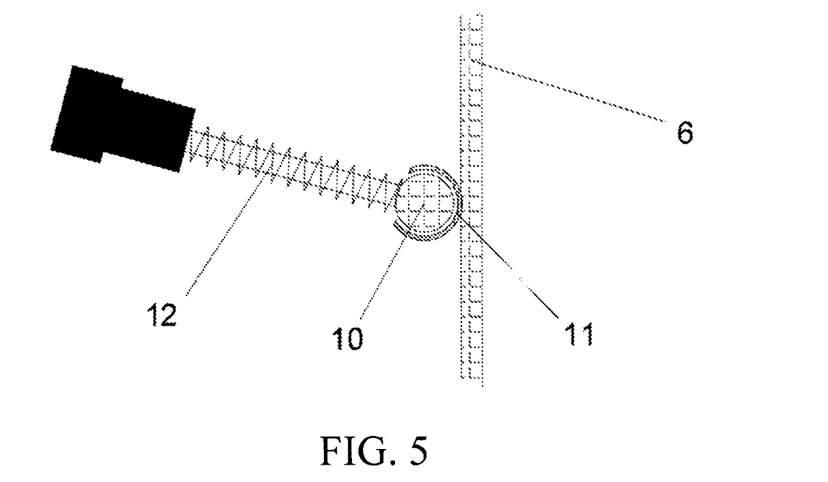
FIG. 5 is a schematic diagram of connecting a carrier board and a hydraulic damper of the system.

An angle sensor 8 is connected to the central analysis and control module and transmits distance data. The carrier board is connected to a base through a connection ball 10, a connection shell 11, and a hydraulic damper 12. The hydraulic damper has a function of shock absorption, preventing a vibration load from being transmitted to precision instruments such as the camera and the laser rangefinder through structures such as a steel plate during construction of the TBM and affecting normal use of the instruments. The connection ball 10 is connected to the hydraulic damper in a manner such as welding. The connection shell 11 wraps around the connection ball 10, so that the connection ball can rotate inside the connection shell but cannot be detached from the connection shell. The connection shell is connected to the carrier board in a manner such as welding. The connection ball and the connection shell enable the hydraulic damper to be connected to the carrier board. The drive mechanism 14 can freely stretch within a certain range, and the drive mechanism connects the hydraulic damper and the base, as shown in FIG. 5.

Figure 3:
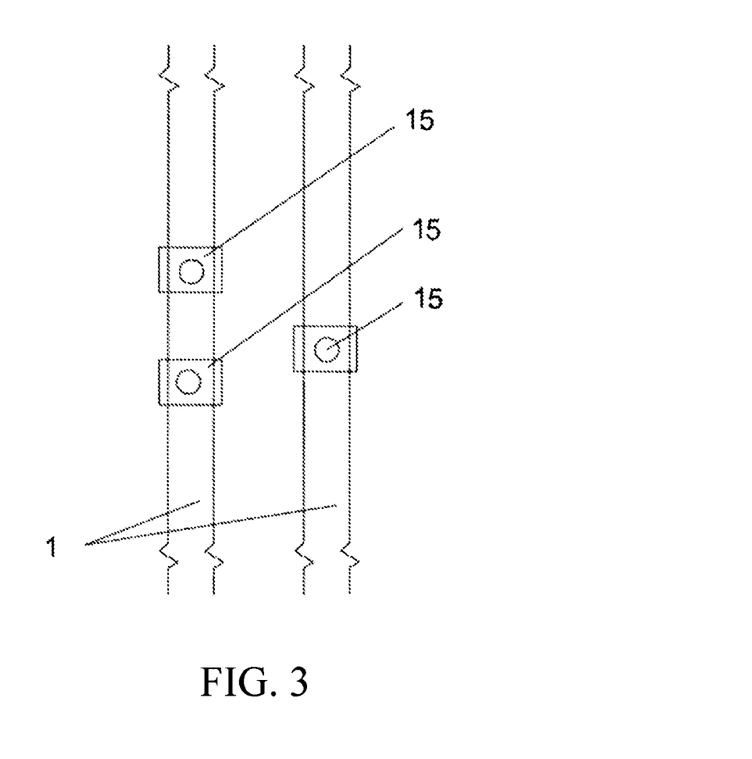
FIG. 3 is a layout diagram of a base of a data collection module of the system.
Figure 6:
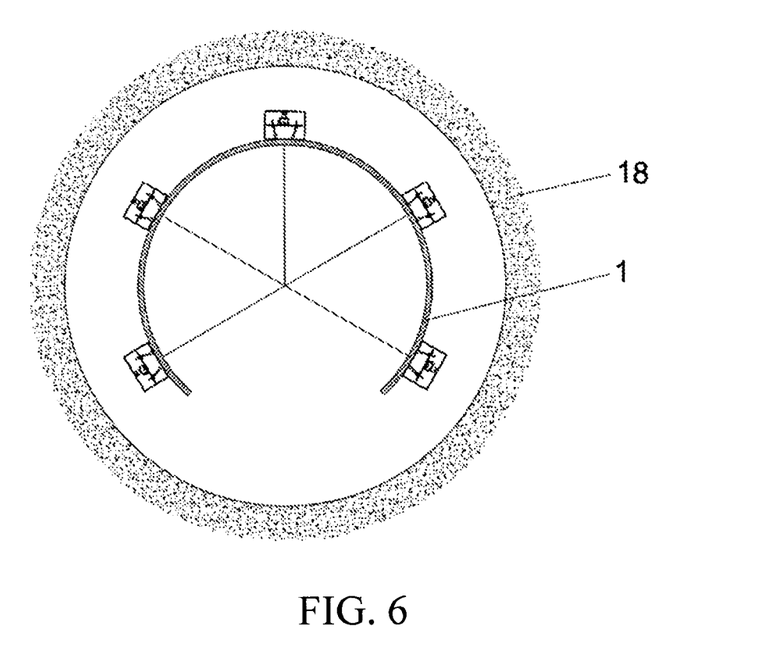
FIG. 6 is a schematic diagram of photographing positions of a camera of the system.

As shown in FIG. 3, there are toothed grooves 16 on a side face of the track 1. In this embodiment, there are three bases 15, and the bases are engaged with the toothed grooves 16. As shown in FIG. 6, the base can move along the track under the action of the motor 13, so that the camera can shoot different positions of surrounding rock 18.

The image processing module stores multiple programs, which can perform preliminary processing on a photograph (removing noise, performing projection transformation processing on an image according to information such as information about a distance between the camera and the surrounding rock 18, and a focal length when the camera is shooting, cropping the image into a surrounding rock image that reflects a fixed surrounding rock range, and splicing pictures according to different angle positions and a distance sequence), to form a picture including the exposed surrounding rock around the entire tunnel.

Certainly, an existing algorithm program may be used to perform the foregoing method.

The image recognition module stores a recognition algorithm program for a surrounding rock feature, a pb file that is trained in advance and that can be used for recognizing a surrounding rock situation, and an algorithm program used for calculating an edge parameter.

Detected edge coordinates $(\varphi, \theta, z)$ are substituted into the formula (1), to obtain a normal vector of a structural plane $(A, B, C)$.

$$\begin{cases} Z = -\dfrac{R\sqrt{A^2+B^2}}{C}\sin(\varphi+\theta) - \dfrac{D}{C} \\ \sqrt{A^2+B^2+C^2} = 1 \\ \theta = \arctan\left(\dfrac{B}{A}\right) \end{cases} \quad (1)$$

In the formula, $(A, B, C)$ is a normal vector of a structural plane, and R is a tunnel radius.

The normal vector of the structural plane is substituted into the following formula to obtain an occurrence of the structural plane in a local coordinate system.

$$\begin{cases} \phi = \arctan(B_0/A_0) + 90 \\ \gamma = \arctan\left(\dfrac{C_0}{\sqrt{A_0^2+B_0^2}}\right) \end{cases} \quad (2)$$

In the formula, $\gamma$ is a direction, and $\phi$ is an inclination.

Figure 7:
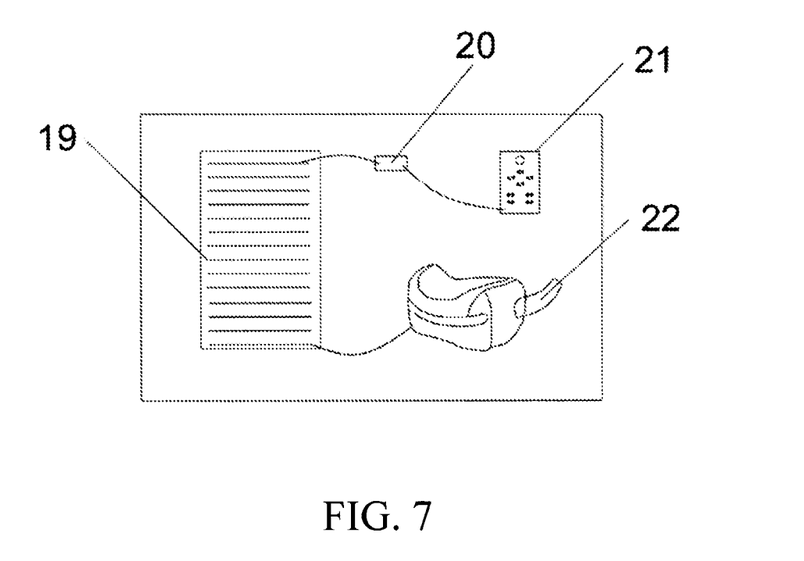
FIG. 7 is a schematic diagram of a virtual reality device of the system.

The virtual reconstruction module includes a three-dimensional information conversion program 19, a signal sensor 20, a remote control 21, and a head-mounted VR display 22, as shown in FIG. 7. The signal sensor 20 is connected to the head-mounted VR display 22, and the remote control can control a working state of the head-mounted VR display 22.

Three-dimensional coordinate conversion is performed by using the following formula:

$$\begin{cases} \alpha = \alpha_0 + \Delta\alpha\dfrac{l}{l_0} \\ x = r\cos\alpha \\ y = r\sin\alpha \\ z = z \end{cases} \quad (3)$$

In the formula, $\alpha$ is an angle between a point and the horizontal, $l_0$ is a vertical length of an image, $\Delta\alpha$ is an angle conversion coefficient, l is a distance between a point to be calculated and the bottom of the image, (x, y, z) are point coordinates after conversion, and r is a tunnel radius.

The working method of the TBM-mounted sketch and virtual reconstruction system for tunnel surrounding rock includes the following steps:

A. The central analysis and control module collects tunneling distance information from the TBM system, delivers an instruction to the controller to control the camera 7 to start and photograph when the distance reaches 1 m, transmits a picture to the image processing module for noise reduction, and then transmits the processed picture to the image recognition module to determine whether the tempered glass 9 needs to be cleaned.

B. If information fed back by the image recognition module to the central analysis module indicates that the tempered glass needs to be cleaned, the central analysis and control module sends an instruction to the controller 17 to control the glass cleaner injector 2 to inject glass cleaner and then control the cleaning brush 3 to rotate and clean the tempered glass.

C. Repeat steps A and B until information fed back by the image recognition module to the central analysis module indicates that the tempered glass does not need to be cleaned.

D. The central analysis and control module delivers an instruction to the controller 17 to control the three laser rangefinders 4 to measure a distance, the laser rangefinders transmit the measured distance information to the central analysis and control module, the central analysis and control module analyzes the three pieces of distance information, and sends an instruction to the controller to make the drive mechanism 14 stretch to ensure that the distances measured by the three rangefinders are equal.

E. Repeat step D until distances measured by the three laser rangefinders are equal, and transmit the distance information to the image processing module.

F. The central analysis and control module delivers an instruction to the controller 17 to make the camera 7 start and photograph the tunnel surrounding rock, and the picture is transmitted to the image processing module for temporary storage.

G. The central analysis and control module delivers an instruction to the controller 17 to make the motor 13 rotate and drive the base 15 and instruments such as the camera to move along the track; at the same time, the central analysis and control module delivers an instruction to the controller 17 to make the angle sensor 8 operate and continuously receives an angle between the camera and the vertical sent from the angle sensor, and the central analysis and control module instructs the motor to stop operating when it is determined that the angle information transmitted from the angle sensor is consistent with preset information.

H. Repeat steps A to F until the surrounding rock is completely photographed. Preset photographing positions are shown in FIG. 6. After photos are taken at the preset angles, the camera returns to an original position.

I. The central control center obtains the tunneling distance information from the TBM, and repeats steps A to F every 1 m, and the system captures several images of the tunnel surrounding rock that reflect a range of at least 1.1 m along the tunneling direction.

J. The image processing module performs noise reduction on the surrounding rock image, and then projects the image according to a focus coverage area parameter of the camera, a focal length of the camera, and the distance information sent by the rangefinder, to form a surrounding rock picture under unified parameters (the same focal length and the same distance between the camera and the tunnel surrounding rock).

K. Project the surrounding rock picture under the unified parameters onto a cylindrical curved surface with the radius of the tunnel as a radius, and cut out a picture of tunnel surrounding rock which is capable of reflecting surrounding rock of a width of approximately 1.1 m, and annotate distance information in the middle of the picture.

L. Splice pictures captured at the same distance according to a sequence that the pictures are sent, to form a surrounding rock image reflecting a 1.1 m range near the unified distance, and then splice the latest spliced image with an existing surrounding rock image reflecting different distances.

M. The image recognition module determines a surrounding rock feature by using a Faster R-CNN method, and then performs secondary processing on some specific features, such as structural plane parameters (direction, trend, dip angle), rock vein intrusion situation, and annotates the features in appropriate positions in the picture. The annotated pictures are sent to the virtual reconstruction module.

N. The virtual reconstruction module performs three-dimensional processing on the picture by using the program 19, and displays the picture on the head-mounted VR display 22 according to a position request sent by an observer by using the remote control 21.

A person skilled in the art should understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer available storage media (including but not limited to a disk memory, a CD-ROM, an optical memory, and the like) including computer available program code.

The present disclosure is described with reference to flowcharts and/or block diagrams of the method, device (system), and computer program product in the embodiments of the present disclosure. It should be understood that computer program instructions can implement each procedure and/or block in the flowcharts and/or block diagrams and a combination of procedures and/or blocks in the flowcharts and/or block diagrams. The computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

The computer program instructions may alternatively be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

The computer program instructions may alternatively be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

The foregoing descriptions are merely preferred embodiments of the present disclosure, but are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

Although the foregoing describes specific implementations of the present disclosure with reference to the accompanying drawings, the protection scope of the present disclosure is not limited. A person skilled in the art should understand that, based on the technical solutions of the present disclosure, various modifications or variations made by a person skilled in the art without creative efforts shall still fall within the protection scope of the present disclosure.

What is claimed is:

1. A TBM-mounted virtual reconstruction system for a tunnel surrounding rock structure, comprising a data collection module, an image processing module, a virtual reconstruction module, an image recognition module, and a central analysis and control module, wherein:
   the data collection module is configured to obtain image information of surrounding rock, send the image information to the image processing module, accept control of the central analysis and control module, and feed back an image obtaining status;
   the image processing module is configured to receive the image information of the surrounding rock, perform projection transformation on captured pictures to reflect distance information of the surrounding rock, crop and splice pictures captured at the same distance to form a surrounding rock image that can reflect exposed surrounding rock of a fixed width, annotate position information of the image in the middle of the image before the splicing, splice images of exposed surrounding rock formed at different distances according to a distance sequence to form a complete image that can reflect exposed surrounding rock of the entire tunnel, then transmit the complete image to the image recognition module, and feed back a module status to the central analysis and control module;
   the image recognition module is configured to perform recognition and position determining on a surrounding rock feature of the complete image, and transmit an image with a position and a feature identifier to the virtual reconstruction module, and feed back a module status to the central analysis and control module;
   the virtual reconstruction module is configured to display the complete image with a description of the surrounding rock feature by using a virtual reality device, to reflect surrounding rock situations at different angles/different positions; and
   the central analysis and control module is configured to control running statuses and signal transmission of other modules.

2. The TBM-mounted virtual reconstruction system for a surrounding rock structure of tunnel according to claim 1, wherein the data collection module comprises a track mounted on the TBM, a carrier board is slidably disposed on the track, an image acquisition apparatus is carried on the carrier board, several laser rangefinders are disposed on an edge of the carrier board, a protective box that moves with the carrier board is sleeved outside the carrier board, at least one face of the protective box is transparent, a cleaning mechanism is disposed on an outer side of the face, and both the image acquisition apparatus and the laser rangefinder are connected to a controller.

3. The TBM-mounted virtual reconstruction system for a surrounding rock structure of tunnel according to claim 2, wherein the cleaning mechanism comprises a glass cleaner injector and a cleaning brush, the glass cleaner injector is disposed on an edge of an inner side of the transparent face of the protective box, the cleaning brush can swing around a connection point between the cleaning brush and the protective box, and the glass cleaner injector and the cleaning brush are controlled by the controller.

4. The TBM-mounted virtual reconstruction system for a surrounding rock structure of tunnel according to claim 1, wherein a connection mechanism is disposed on a lower end of the carrier board to connect the carrier board to the track, the connection mechanism comprises a connection shell, a connection ball, a hydraulic damper, and a telescopic mechanism that are sequentially connected, the telescopic mechanism is connected to the track through a base, the connection shell is disposed on the lower end of the carrier board, and an angle sensor is further disposed on a lower surface of the carrier board.

5. The TBM-mounted virtual reconstruction system for a surrounding rock structure of tunnel according to claim 4, wherein the connection shell and the connection ball are rotatably connected to each other.

6. The TBM-mounted virtual reconstruction system for a surrounding rock structure of tunnel according to claim 4, wherein a toothed groove is provided on the track, and the base can be engaged with the toothed groove.

7. The TBM-mounted virtual reconstruction system for a surrounding rock structure of tunnel according to claim 1, wherein the image recognition module recognizes the surrounding rock feature and the position in the image by using a Faster R-CNN method, and annotates feature information at the position of the corresponding feature in the spliced image; or
   the surrounding rock feature comprises an intrusion situation, a structural plane occurrence, a slough situation, and a water leakage situation.

8. The TBM-mounted virtual reconstruction system for a surrounding rock structure of tunnel according to claim 1, wherein the virtual reality device is a head-mounted AR/VR device.

9. A working method of the system according to claim 1, comprising the following steps:
   capturing a set of surrounding rock images at different preset angles at intervals;
   performing projection transformation on captured pictures to form a rock image under unified conditions;
   cropping the modified image, so that each picture can reflect only a surrounding rock situation of a fixed-dimension range; annotating and displaying, in the middle of the picture, a distance at which the picture is captured, and splicing, in sequence, all pictures that are captured at the same distance and that are obtained after the projection and the cropping, to form one picture; and splicing the picture and an existing spliced image of tunnel surrounding rock;
   detecting a surrounding rock feature situation and a related position, and adding parameter information at a corresponding position in the picture; and
   completely reconstructing a complete spliced image of the exposed tunnel surrounding rock, a feature, and corresponding position information by using a virtual reality technology.

10. The working method according to claim 9, wherein the image acquisition apparatus is docked at an initial position, the carrier board adjusts a relative position with the surrounding rock to make a lens of the image acquisition apparatus directly face the surrounding rock, the image acquisition apparatus regularly obtains a tunneling distance parameter from the TBM system, the carrier board drives the image acquisition apparatus to move along the track to photograph the surrounding rock when a moving distance reaches a specified length, and the image acquisition apparatus returns to the initial position after photographing.

* * * * *